(12) United States Patent
Lee et al.

(10) Patent No.: US 9,462,033 B2
(45) Date of Patent: Oct. 4, 2016

(54) PROOFING ELECTRONIC PUBLICATIONS ON PORTABLE DEVICES

(71) Applicant: Apple Inc., Cupertino, CA (US)

(72) Inventors: Jeffery T. Lee, Los Gatos, CA (US);
Alan C. Cannistraro, London (GB);
Melissa Breglio Hajj, San Francisco, CA (US); Casey M. Dougherty, San Francisco, CA (US); Ryan S. Lynch, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 13/708,880

(22) Filed: Dec. 7, 2012

(65) Prior Publication Data

US 2013/0185346 A1    Jul. 18, 2013

Related U.S. Application Data

(60) Provisional application No. 61/568,115, filed on Dec. 7, 2011.

(51) Int. Cl.
*G06F 15/16* (2006.01)
*H04L 29/08* (2006.01)

(52) U.S. Cl.
CPC ........... *H04L 67/02* (2013.01); *H04L 67/1095* (2013.01)

(58) Field of Classification Search
USPC .......... 709/201, 203; 370/429; 345/157, 173
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | * 10/1998 | Bisset | G06F 3/044 345/157 |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 * | 3/2006 | Morohoshi | G06F 3/03545 345/156 |
| 7,184,064 B2 | 2/2007 | Zimmerman et al. | |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Tammy Nguyen
(74) *Attorney, Agent, or Firm* — Morrison & Foerster LLP

(57) ABSTRACT

A user can proof (e.g., view, review) an electronic publication on a portable device. When the user finds errors in the electronic publication on the portable device, the user can edit the electronic publication on the editing device. The changes can be automatically synchronized with the portable device and displayed so that the user can review the changes and continue proofing the electronic publication on the portable device. In some implementations, an editing device can monitor files associated with an electronic publication for changes to the files and, when changes are detected, the files can be automatically synchronized to a portable device coupled to the editing device.

17 Claims, 8 Drawing Sheets

(56) References Cited

U.S. PATENT DOCUMENTS

| | | | |
|---|---|---|---|
| 7,663,607 B2* | 2/2010 | Hotelling | G06F 3/0416 |
| | | | 178/18.01 |
| 8,479,122 B2 | 7/2013 | Hotelling et al. | |
| 2006/0026521 A1 | 2/2006 | Hotelling et al. | |
| 2006/0197753 A1* | 9/2006 | Hotelling | G06F 1/1626 |
| | | | 345/173 |
| 2008/0075103 A1* | 3/2008 | Noble | H04L 12/2697 |
| | | | 370/429 |
| 2014/0250170 A1* | 9/2014 | Duggal | G06F 9/468 |
| | | | 709/203 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PROOFING ELECTRONIC PUBLICATIONS ON PORTABLE DEVICES

FIELD OF THE DISCLOSURE

The disclosure generally relates to editing electronic documents.

BACKGROUND OF THE DISCLOSURE

Users often read electronic publications on portable devices. Electronic books, magazines, websites and newspapers, for example, can be read on tablet computers, smartphones, text readers and other handheld devices. Consistently displaying electronic publication content on heterogeneous devices can be problematic. For example, due to differences in device capabilities and characteristics, the content may display properly on one device while another device may display the content with various display errors. Thus, an electronic publisher may need to proof the electronic publication on a variety of devices and edit the electronic publication to accommodate the characteristics of each device before publishing the electronic publication.

SUMMARY OF THE DISCLOSURE

A user can proof (e.g., proofread, view, review) an electronic publication on a portable device. When the user finds errors in the electronic publication on the portable device, the user can edit the electronic publication on an editing device. The changes can be automatically synchronized with the portable device and displayed so that the user can review the changes and continue proofing the electronic publication on the portable device. In some implementations, the editing device can monitor files associated with an electronic publication for changes to the files and, when changes are detected, the files can be automatically synchronized to a portable device coupled to the editing device.

Particular implementations provide at least the following advantages: A user can quickly proof an electronic publication on a portable device without having to manually synchronize or update the electronic publication when changes are made to the electronic publication on an editing device. Multiple portable devices can be synchronized and proofed concurrently. Synchronization of files can be prioritized based on which portion of the electronic document is currently displayed on the portable device allowing the user to quickly view changes made to currently displayed portions of the electronic publication.

Details of one or more implementations are set forth in the accompanying drawings and the description below. Other features, aspects, and potential advantages will be apparent from the description and drawings, and from the claims.

BRIEF DESCRIPTION OF DRAWINGS

Like reference symbols in the various drawings indicate like elements.

DETAILED DESCRIPTION

Proofing System

Figure 1:
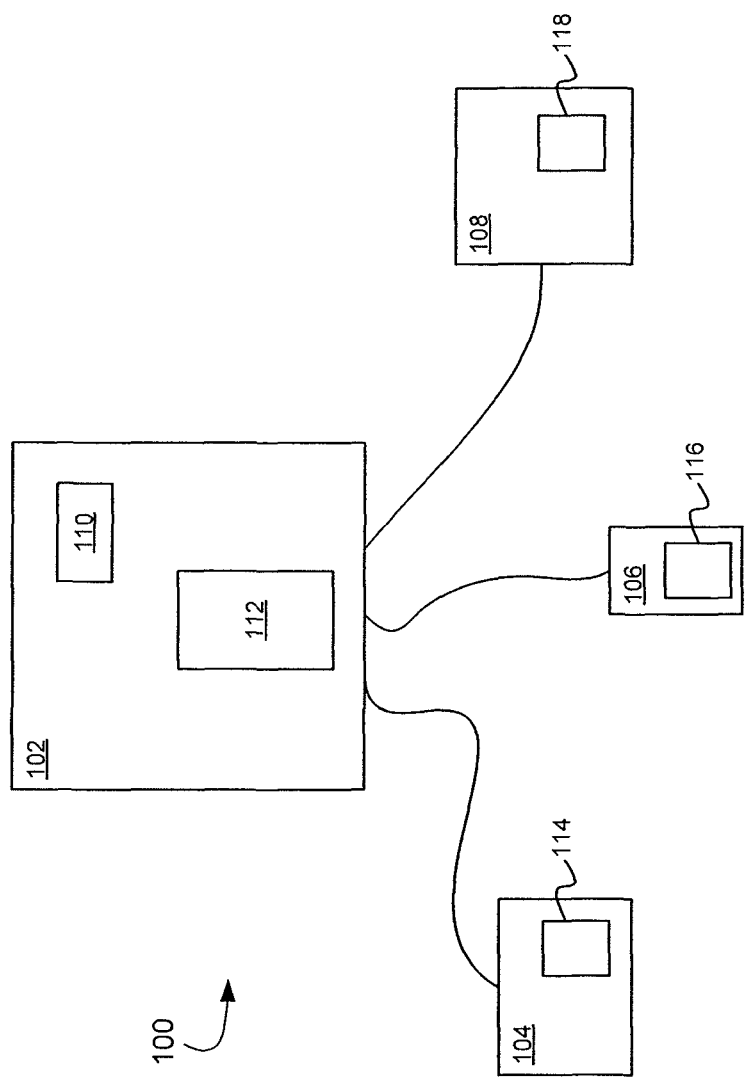
FIG. 1 illustrates an example system for proofing electronic publications on portable devices.

FIG. 1 illustrates an example system 100 for proofing electronic publications on portable devices. In some implementations, editing device 102 can identify changes made to an electronic publication 110 and transmit the changes to portable devices 104, 106 and/or 108 while the electronic publication is being proofed (e.g., reviewed, proofread) on the portable devices. For example, electronic publication 110 can be an electronic book, an electronic magazine, a webpage, an electronic newspaper or a software application. The electronic publication can be a bundle of files that includes many files of many different types. The electronic publication files can be text files corresponding to pages, chapters, sections, etc. of the electronic publication. The electronic publication files can be image, sound, video or other media files that can be presented when electronic publication 110 is presented to a reader. For example, images, sound, video, etc. can be embedded in the pages of an electronic book along with text and presented to a user as the user is reading the electronic book. The files can have different formats (e.g., text, HTML, PDF, MP3, MP4, JPEG. etc.).

In some implementations, editing device 102 can include synchronization application 112. For example, synchronization application 112 can be a software application that runs on editing device 102. In some implementations, synchronization application 112 can be configured to monitor the electronic publication files associated with electronic publication 110 for changes to the files. For example, changes to the electronic publication files can be detected by detecting a change in file metadata (e.g., timestamp, file size, hash values, etc.) associated with the file. For example, a file that has been edited can have a changed timestamp indicating when the file was last edited. A file that has been edited will change in size according to what has been added to or deleted from the file, for example. In some implementations, changes to electronic publication files can be detected by comparing hash data associated with the file. For example, the contents of a file can be hashed to generate a hash value for the file and the hash value can be stored. Later, the contents of the file can be hashed again to generate a new hash value. The new hash value can be compared with the stored hash value to determine if the file has changed.

In some implementations, editing device 102 can synchronize electronic publication file changes to portable devices 104, 106 and/or 108. For example, synchronization application 112 can transmit changed electronic publication files to portable devices 104, 106 and/or 108. For example, synchronization application 112 can be an electronic publication server application that delivers electronic publication files to electronic publication client applications 114, 116, and/or 118 running on portable devices 104, 106 and/or 108. In some implementations, editing device 102 (or synchronization application 112) can detect when portable devices 104, 106 and/or 108 (or electronic publication clients 114, 116 and/or 118) are connected to editing device 102. For example, portable devices 104, 106 and/or 108 can be physically connected to editing device 102 directly (e.g., tethered) or indirectly (e.g., networked). Portable devices 104, 106 and/or 108 can be wirelessly connected to editing device 102 directly (e.g., Bluetooth) or indirectly (e.g., through a wireless network). In some implementations, electronic publication clients 114, 116 and/or 118 can be software applications that provide access to and display electronic publications, such as electronic publication 110. For example, the electronic publication clients 114, 116 and/or 118 can be configured to present a graphical user interface (e.g., a bookshelf) that allows a user to select electronic publication 110 and display the contents of electronic publication 110 on portable devices 104, 106 and/or 108.

In some implementations, a user can use portable devices 104, 106 and/or 108 (and electronic publication clients 114, 116 and/or 118) to proof the electronic publication. For example, the user can display electronic publication 110 on portable devices 104, 106 and/or 108, proofread electronic publication 110, and determine if electronic publication 110 displays properly on each device. Because portable devices 102, 104, 106 and 108 can be heterogeneous devices (e.g., laptop computer, desktop computer, tablet computer, smartphone, text reader, etc.), electronic publication 110 can be displayed differently on each device. A user can proof electronic publication 110 on each portable device to ensure that electronic publication 110 displays properly on each portable device.

In some implementations, if a user finds an error in the presentation of electronic publication 110 on a portable device (e.g., portable device 104), the user can edit electronic publication 110 on editing device 102 using any appropriate editor (e.g., text editor, graphics editor, etc.) and save the changes to electronic publication 110. Once the changes to electronic publication 110 are saved, synchronization application 112 can detect that changes have been made to the files associated with electronic publication 110 and synchronize the changed files to portable devices 104, 106 and/or 108.

Synchronization Application Interfaces

Figure 2:
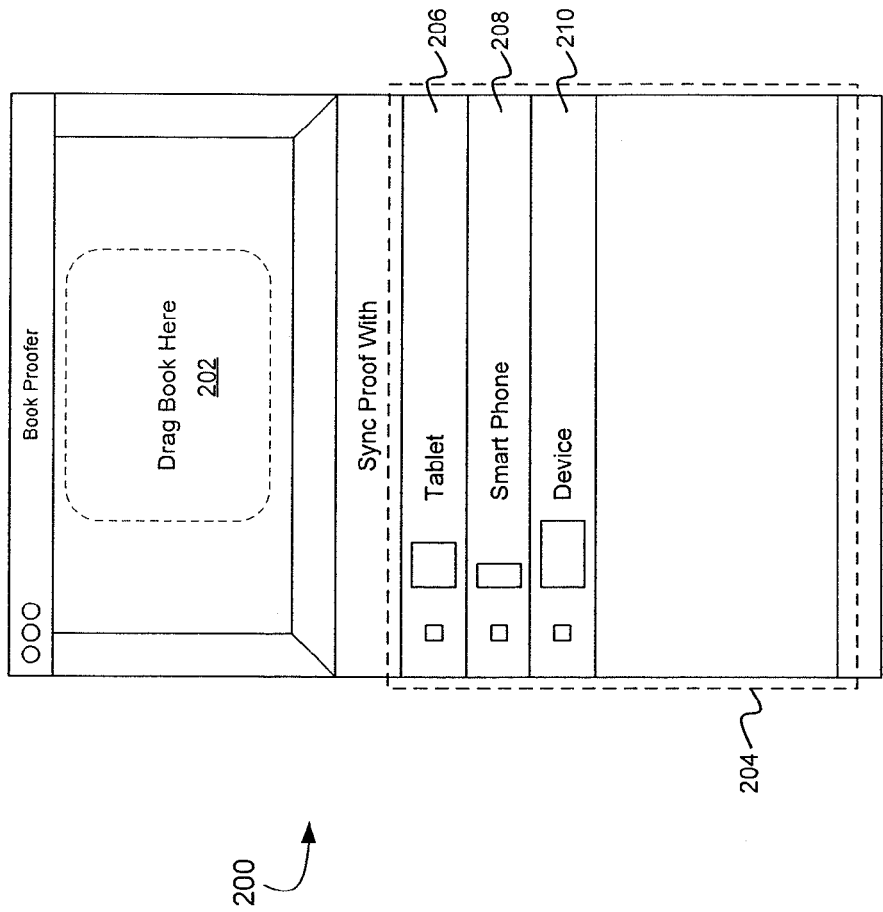
FIG. 2 illustrates an interface for managing synchronization of electronic publications.

FIG. 2 illustrates an interface 200 for managing synchronization of electronic publications. For example, interface 200 can be a graphical user interface for synchronization application 112. When synchronization application 112 is executed on editing device 102, interface 200 can be displayed. In some implementations, a user can drag an electronic publication into area 202 in interface 200 in order to synchronize electronic publication 110 with other devices (e.g., portable devices 104, 106 and 108). For example, a user of editing device 102 can identify an electronic publication for synchronizing by dragging and dropping an icon representing electronic publication 110 into area 202.

In some implementations, area 204 can display information about portable devices that can receive electronic publication updates. For example, area 204 can present a list of devices (e.g., portable devices 104, 106, 108) that are configured with client applications (e.g., electronic publication clients 114, 116, 118) and that are currently connected to editing device 102 and synchronization application 112. For example, information items 206, 208 and 210 can correspond to portable devices 104, 106 and 108, of FIG. 1. Information items 206, 208 and/or 210 can present information, such device identifiers (e.g., names), images representing device types, and checkboxes for selecting devices to synchronize with electronic publication updates or changes. Information items 206, 208 and 210 can present portable device status information. For example, information items 206, 208 and 210 could indicate the status of the portable device (e.g., available, busy, non-responsive, etc.) and/or the status of synchronization operations (e.g., percent complete, successful completion, errors, etc.).

Figure 3:
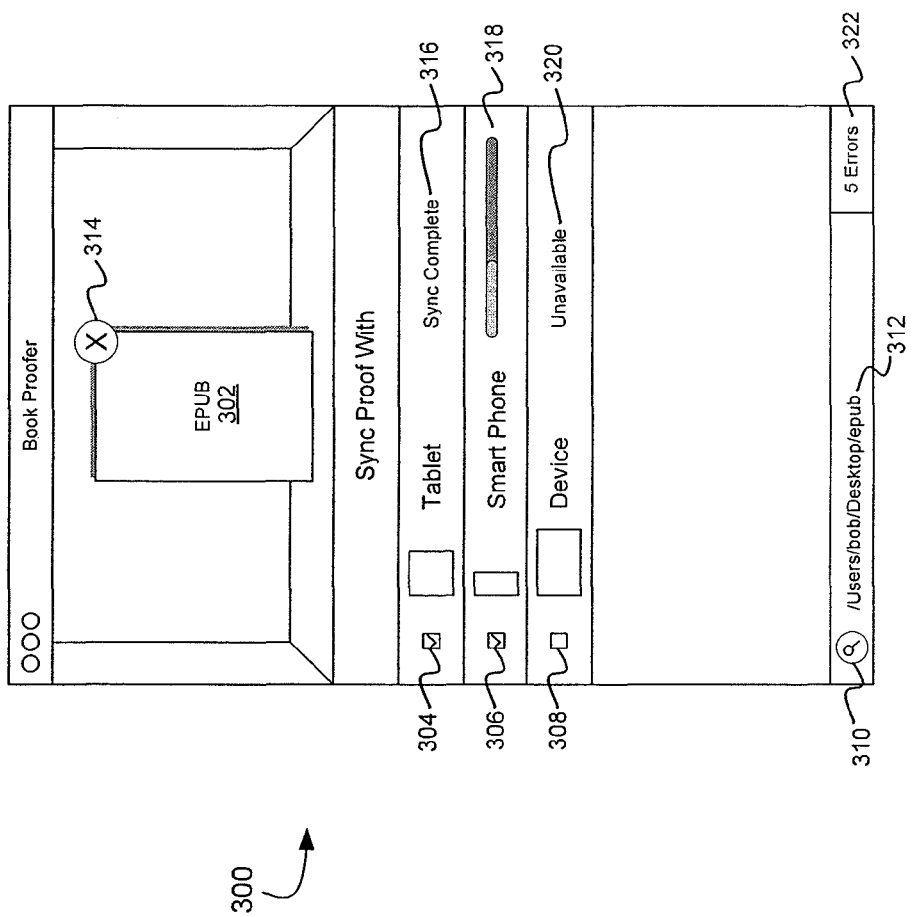
FIG. 3 illustrates an interface for managing synchronization of an identified electronic publication.

FIG. 3 illustrates an interface 300 for managing synchronization of an identified electronic publication. For example, an electronic publication can be identified to the synchronization application by dragging and dropping the electronic publication onto interface 300. An electronic publication can be identified to the synchronization application through the use of menu items as well. For example, a user can invoke a file open menu item or dialog box to identify or select an electronic publication.

In some implementations, when electronic publication 110 has been identified to synchronization application 112, an image representing electronic publication 110 can be displayed on interface 300. For example, when a user selects electronic publication 110 by dragging and dropping electronic publication 110 onto area 202, image 302 representing electronic publication 110 can be displayed. In some implementations, image 302 can be a custom image associated with the electronic publication. For example, image 302 can be a book cover image designed for a particular book. In some implementations, image 302 can be a default image. For example, a generic image of a book can be used and information (e.g., an identifier, name, filename, etc.) associated with the electronic publication can be presented on the generic image.

In some implementations, a user can select which devices get synchronized with electronic publication updates. For example, a user can select one or more of checkboxes 304, 306 and 308 to identify which devices (e.g., portable devices 104, 106, 108) will receive synchronization updates from editing device 102 (e.g., synchronization application 112). In some implementations, only selected client devices will be synchronized. For example, only devices having a checked box (e.g., checkboxes 304, 306) will receive synchronization updates when changes to electronic publication 110 are detected by synchronization application 112. Devices having an unchecked box (e.g., 308) will not receive electronic publication synchronization updates, for example.

In some implementations, interface 300 can include graphical element 310 for displaying the location of an electronic publication. For example, if a user selects graphical element 310, a window can be presented that shows the contents of the operating system file directory in which the currently selected electronic publication is stored on editing device 102. In some implementations, interface 300 can include electronic publication location information 312. For example, location information 312 can include a character string that identifies a directory location in which the currently selected electronic publication is stored on editing device 102.

In some implementations, a user can cancel the monitoring and synchronization of an electronic publication with other devices. In some implementations, a user can provide input over image 302 to cause graphical element 314 to be displayed. For example, a user can hover a cursor over image 302 using an input device (e.g., mouse, touch pad, etc.). A user can hold a finger over image 302 if editing device 102 is configured for touch input (e.g., device 102 has a touch sensitive display). For example, after the touch input is received for a predetermined period of time (e.g., a second), graphical element 314 can be displayed.

In some implementations, a user can cancel the synchronization of the electronic publication by selecting graphical element 314. For example, the user can select graphical element 314 by cursor input (e.g. clicking a mouse button) or by touch input (e.g., touching a touch sensitive display over the location of graphical element 314). When the user selects graphical element 314, image 302 can be removed from display on interface 300 and synchronization application 112 will no longer synchronize the electronic publication. In some implementations, a user can cancel synchronization of a current electronic publication by identifying a different electronic publication to synchronize. For example, a user can drag and drop a new electronic publication into interface 300 to cause synchronization application 112 to synchronize the new electronic publication and to stop synchronizing the previous electronic publication.

In some implementations, interface 300 can present portable device status information. For example, information items 316, 318 and 320 can indicate the status of the portable device (e.g., available, busy, non-responsive, etc.) and/or the status of synchronization operations (e.g., percent complete, successful completion, errors, etc.). In some implementations, interface 300 can present error information. For example, interface 300 can present error information item 322 indicating the number of errors raised while processing an electronic publication. In some implementations, a user can select information item 322 to display descriptions of the errors. For example, a user can select information item 322 to cause a window to appear containing a description of errors raised during the processing (e.g., synchronization, validation, etc.) of an electronic publication.

Electronic Publication Client Interfaces

Figure 4:
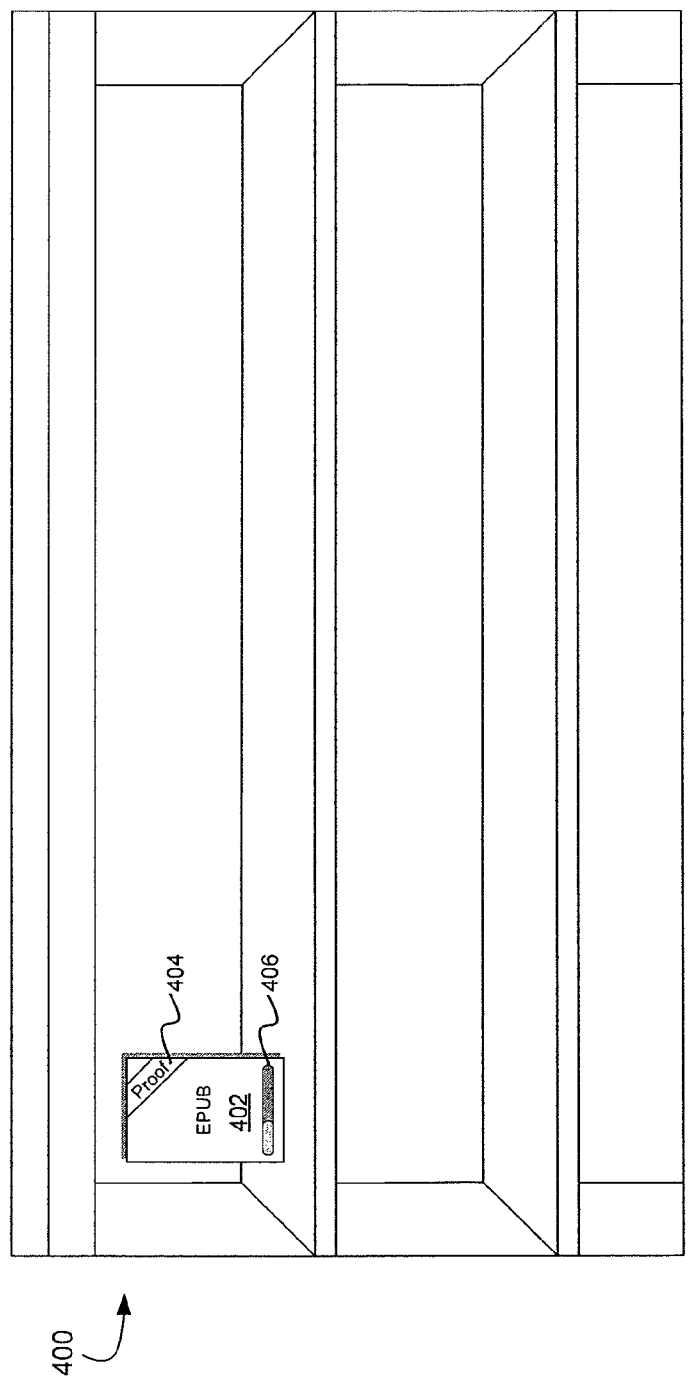
FIG. 4 illustrates an interface for accessing an electronic publication on a portable device.

FIG. 4 illustrates an interface 400 for accessing an electronic publication on a portable device. For example, interface 400 can be a graphical interface associated with electronic publication clients 114, 116 and 118 of FIG. 1. In some implementations, interface 400 can present a bookcase metaphor. For example, interface 400 can appear to be a bookcase having one or more books, magazines, documents or other electronic publications on the shelves of the bookcase. In some implementations, image 402 can be displayed. Image 402 can be an image that represents an electronic publication available for selection and viewing through interface 400. In some implementations, image 402 can represent an electronic publication that is being downloaded or synchronized to the portable device.

In some implementations, image 402 can be displayed on interface 400 when electronic publication 110 is being synchronized with a portable device displaying interface 400. For example, image 402 can be displayed in interface 400 once the synchronization process between editing device 102 and portable device 104, 106 or 108 has started. For example, at the beginning of the synchronization process, editing device 102 can transmit electronic publication metadata to portable device 104 identifying an author and title for the electronic publication. Once the electronic publication metadata is received, image 402 can be displayed along with author and title information. In some implementations, image 402 can include information item 404. Information item 404 can include information identifying electronic publication 110 as a work in progress as opposed to a completed, published work. For example, information item 404 can include a "Proof" label indicating that electronic publication 110 is being proofread on the device and is not a completed work. In some implementations, image 402 can be overlaid with status indicator 406. For example, status indicator 406 can represent the current state of synchronization of electronic publication 110 and can be displayed when electronic publication files are being uploaded or synchronized with the portable device.

In some implementations, a user can select an electronic publication from the shelves of the bookcase by selecting an icon or other image representing the electronic publication. For example, a user can select image 402 to cause the content of electronic publication 110 to be displayed.

Figures 5, 6:
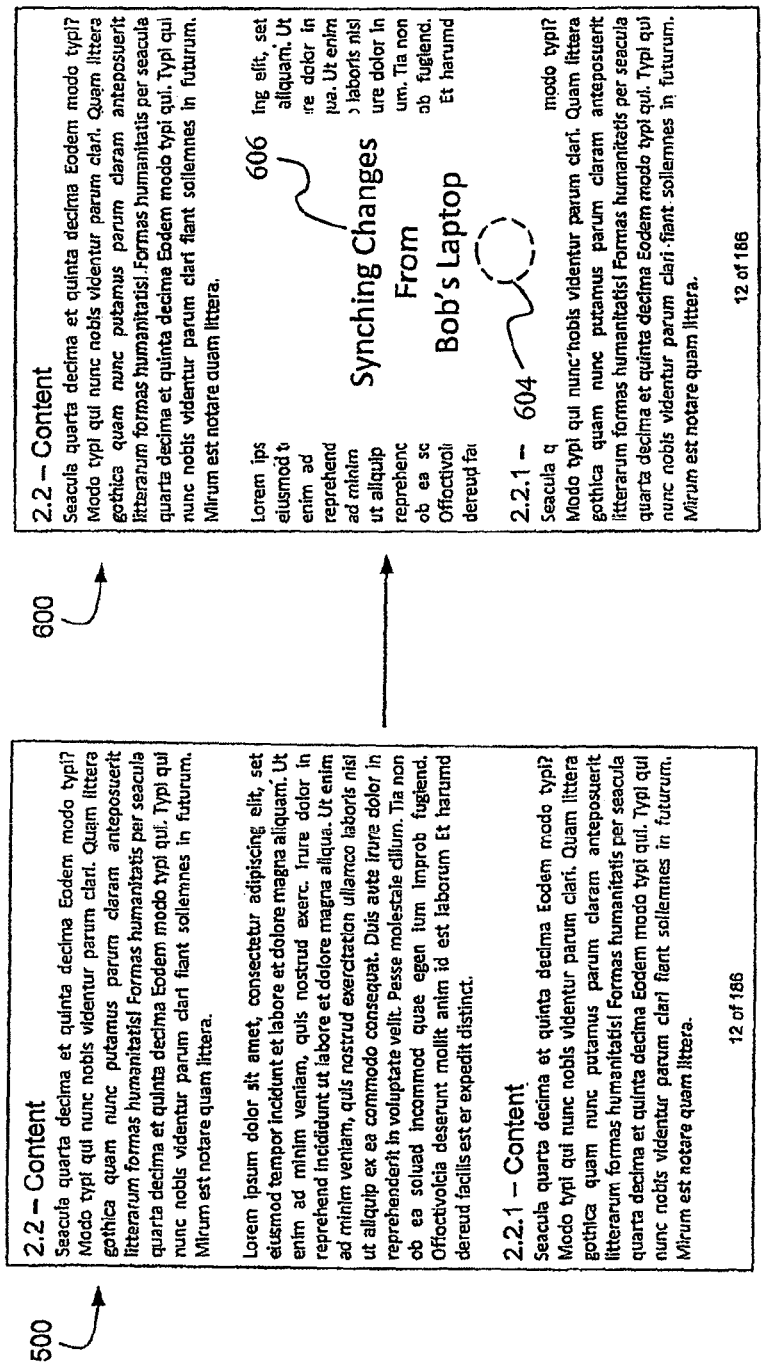
FIG. 5 illustrates an interface for presenting electronic publication content on a portable device.
FIG. 6 illustrates an interface for presenting synchronization information on a portable device.

FIG. 5 illustrates interface 500 for presenting electronic publication content on a portable device. In some implementations, when a user selects image 402 of FIG. 4, the contents of the electronic publication can be displayed on interface 500. In some implementations, synchronization updates can be received while a user is viewing electronic publication content in interface 500.

FIG. 6 illustrates interface 600 for presenting synchronization information on a portable device. In some implementations, when synchronization updates are received while electronic publication content is displayed, interface 600 can be presented. For example, when a synchronization update is received while interface 500 is displayed, the content displayed on interface 500 can be temporarily hidden or veiled. In some implementations, an opaque or semi-transparent sheet 602 (e.g., veil) can be placed over the content displayed by interface 500 while synchronization updates are received by the portable device. For example, sheet 602 can appear to slide into view from an edge of interface 500 until sheet 602 covers the electronic publication content.

In some implementations, sheet 602 can present information about the current synchronization update. For example, sheet 602 can display a spinning status indicator 604 that indicates to the user that a synchronization update is ongoing. Sheet 602 can display informational text 606 that provides the user with additional information about the current synchronization. For example, informational text 602 can include version information, source information, timestamps and/or filenames associated with the current synchronization update of the electronic publication. In some implementations, once the synchronization update is complete, sheet 602 can be removed (e.g., slid off screen) and interface 500 can be displayed. For example, when sheet 602 is removed, interface 500 can display the newly updated and synchronized content received for the electronic publication.

Example Processes

Figure 7:
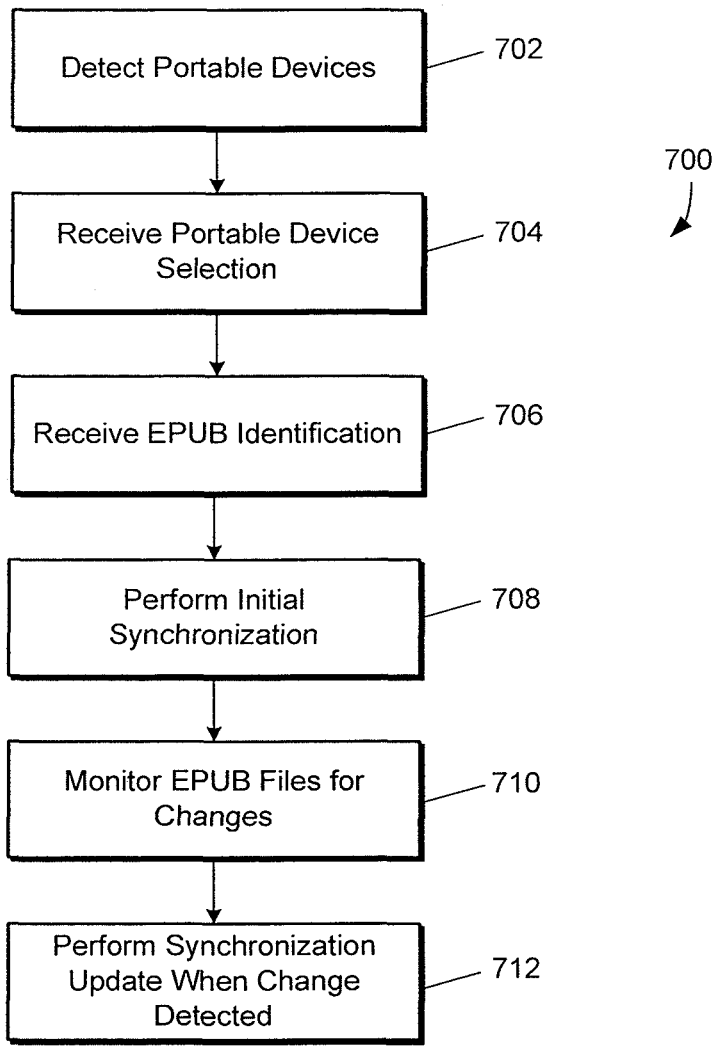
FIG. 7 is flow diagram of an example process for synchronizing electronic publication changes on an editing device.

FIG. 7 is flow diagram of an example process 700 for synchronizing electronic publication changes on an editing device. In some implementations, changes (e.g., edits) made to an electronic publication on an editing device (e.g., editing device 102) are automatically synchronized to one or more portable devices. For example, automatically synchronizing the changes to the portable devices can allow a user to proof (e.g., proofread) the electronic publication on the portable devices while editing the electronic publication on the editing device to fix errors found during the proofing without requiring the user to take extra steps to synchronize or upload the changes to the portable devices.

At step 702, one or more portable devices are detected. In some implementations, an editing device can detect when one or more portable devices are connected to the editing device. For example, synchronization application 112 on the editing device 102 can detect corresponding electronic publication client applications 114, 116, 118 running on portable devices 104, 106 and/or 108 when the portable devices are connected to the editing device.

At step 704, selection of at least one portable device is received. In some implementations, a list of the connected portable devices can be displayed. For example, the server application on the editing device can present a graphical user interface (FIG. 2) that displays a list of the portable devices that are connected to the editing device and that also are running the client electronic publication application. In some implementations, a user can select one or more of the connected portable devices to identify which of the connected portable devices will receive electronic publication synchronization updates.

At step 704, identification of an electronic publication is received. In some implementations, a user can identify an electronic publication by dragging and dropping an icon or image associated with an electronic publication one interface 200 of FIG. 2. For example, if the electronic publication is stored on the desktop of a device, the user can drag the electronic publication files from the desktop onto interface 200 and drop the electronic publication files into area 202. In some implementations, a user can identify an electronic publication by selecting menu items associated with the server application. For example, a user can interact with a file open menu item or user interface to identify or select the electronic publication.

At step 706, initial synchronization is performed. In some implementations, once the electronic publication is identified and at least one portable device is connected and selected, an initial synchronization of the electronic publication to the portable device is performed. In some implementations, the synchronization application sends metadata associated with the electronic publication to the electronic publication client application. For example, the electronic publication metadata can include author and title information for the electronic publication. In some implementations, metadata associated with each file in the electronic publication can be sent to the electronic publication client application. The metadata can include a file identifier (e.g., file name), timestamp, file size and/or hash values. The timestamp can correspond to the date and time of the last file change, for example. The metadata can include a description of the change to the file. For example, the metadata can indicate that a file has been changed, added or deleted. In some implementations, the synchronization server will receive from the electronic publication client application a list of electronic publication files on the portable device that have different metadata (e.g., timestamps, file sizes, hash values) than the electronic publication file metadata sent to the electronic publication client application. The synchronization server will then synchronize the files identified in the received list to a storage location on the client device. For example, the synchronization server can copy, overwrite or delete files on the portable device while performing the synchronization. Once the initial synchronization is performed, the electronic publication files on the editing device are monitored for changes.

At step 708, the electronic publication is monitored for changes. In some implementations, the synchronization application monitors the electronic publication files for changes. For example, the synchronization application can collect metadata associated with electronic publication files. The file metadata can include timestamps (e.g., time of last access), file size, checksums, or any other data that can be used to determine whether a file has been modified. In some implementations, the synchronization application can store the file metadata and later compare the stored file metadata to current file metadata to determine if the file has been modified. For example, if the current timestamp is different than the previous timestamp, the file has been changed. If the current file size is larger or smaller than the previous file size, the file has changed. In some implementations, an electronic publication includes a plurality of files. Thus, when monitoring the electronic publication for changes, the synchronization application will monitor all of the files that are included in the electronic publication.

At step 712, a synchronization update is performed when file changes are detected. In some implementations, once a changed electronic publication file is detected, an electronic publication synchronization update is performed. For example, the electronic publication synchronization update can be performed immediately upon detecting a changed file. The electronic publication synchronization update can be performed after a predetermined delay (e.g., 2 seconds), for example. Once the changed file (or files) is detected a synchronization update can be performed. For example, the synchronization application can send metadata associated with the changed files to the electronic publication client application. The file metadata can include a file identifier (e.g., file name), a timestamp (e.g., corresponding to when the change was made) and a file size for each file. The file metadata can include information describing the change made to the file (e.g., file modified, added or deleted). The synchronization application can receive from the electronic publication client a list of electronic publication files that are on the client device and that do not match the sent electronic publication file metadata. The synchronization server can then copy (or delete) the files to a storage location on the client device. For example, the synchronization server can write, overwrite or delete the files directly in the storage location of the electronic publication on the portable device.

Figure 8:
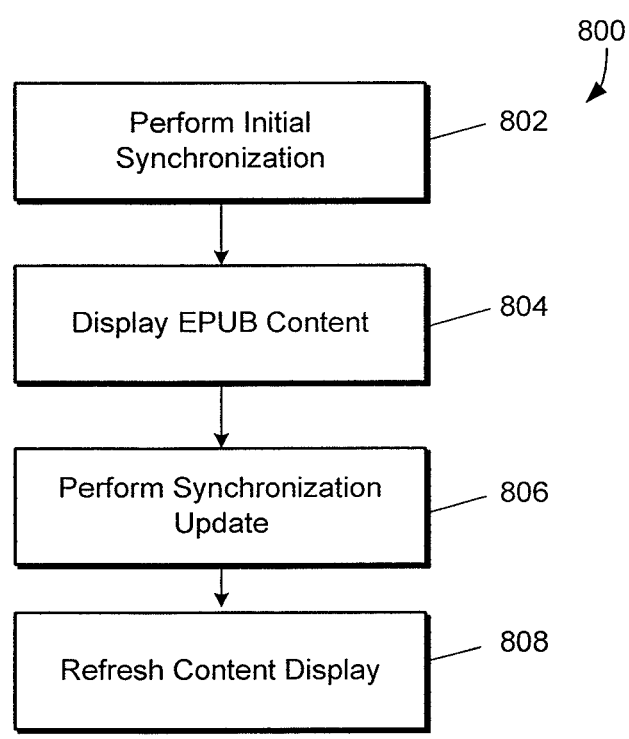
FIG. 8 is flow diagram of an example process for synchronizing electronic publications on a portable device.

FIG. 8 is flow diagram of an example process 800 for synchronizing electronic publications on a portable device. In some implementations, a client device can display the contents of an electronic publication while receiving updates to the electronic publication. For example, a user can proofread an electronic publication on the client device, discover an error in how the content is displayed on the client device, edit the electronic publication on an editing device coupled to the client device, the edits to the electronic publication can be automatically synchronized with the client device, and the user can review the changes and continue proofing the electronic publication.

At step 802, an initial synchronization is performed. For example, a portable device can be coupled to an editing device. The portable device can be running an electronic publication client application. The editing device can be running an electronic publication synchronization application. The electronic publication client application can receive metadata associated with an electronic publication from the electronic publication synchronization application. The electronic publication metadata can include author and title information so that the electronic publication client application can display information for the electronic publication. For example, the electronic publication client application can display an electronic publication image with author and title information, as described with reference to FIG. 4.

In some implementations, electronic publication file metadata be received by the electronic publication client application and can include an identifier, timestamp file size and/or hash values for each file in the electronic publication. The electronic publication client application can compare the file metadata to file metadata associated with locally stored (e.g., on the portable device) electronic publication files, identify which locally stored electronic publication files do not match the received electronic publication file metadata and send a list of the identified files to the electronic publication synchronization application. The electronic publication synchronization application can then access the local storage (e.g., hard disk, flash memory, etc.) on the portable device to synchronize the identified files on the editing device to the electronic publication files on the portable device. For example, the electronic publication synchronization application can overwrite, copy and delete files on the portable device using direct storage access while performing the synchronization. In some implementations, while initial synchronization is performed, a progress indicator (e.g., 406 of FIG. 4) can be displayed that indicates the progress made during the synchronization process. For example, progress can be determined as a number of files processed, estimated amount of time remaining, percentage of files processed, etc.

At step 804, the electronic publication content is displayed. For example, a user can select electronic publication image 402 of FIG. 4 to cause the content of the electronic publication to be displayed on the portable device, as illustrated by FIG. 5.

At step 806, a synchronization update is performed. For example, one or more electronic publication files can be edited on the editing device. When changes to the electronic publication files are made, the electronic publication client application can receive file metadata associated with the changed files from the synchronization application on the editing device. The file metadata can include electronic publication file identifiers, timestamps file sizes and/or hash values associated with each of the changed files. The electronic publication client application can compare the received file metadata to file metadata associated with corresponding local electronic publication files (e.g., electronic publication files on the portable device), identify which corresponding files have mismatched file metadata, and send a list of the identified files to the synchronization application. The synchronization application can then synchronize the identified (changed) files on the editing device with the corresponding files on the portable device. For example, the synchronization application can copy, overwrite, and delete electronic publication files on the portable device so that the portable device electronic publication files match the newly edited electronic publication files on the editing device.

At step 808, the electronic publication content display is refreshed. In some implementations, the electronic publication client application can detect when electronic publication files have been changed in local storage on the portable device and reload the files for display. For example, once a synchronization has occurred, the electronic publication client can reload content from the changed files and present the content on a user interface (e.g., interface 500) so that a user can view the content. In some implementations, when the electronic publication client application reloads the content from the changed files, the electronic publication client can drop a veil over the currently displayed content until the reloading is complete, as illustrated by FIG. 6. For example, the electronic publication client application can reload or refresh partial content updates without closing the electronic publication. In some implementations, the electronic publication client application must close and reload the entire electronic publication. For example, when the electronic publication client application detects that a particular file has changed (e.g., a table of contents file), the electronic publication client will close the electronic publication and perform a complete reload of the contents. When the updated content has been reloaded, the veil can be removed and the updated content can displayed on the portable device.

Synchronization Priority

In some implementations, synchronization of electronic publication files can be prioritized. For example, as a user is proofing an electronic publication on a portable device, the user may find an error in the display on the electronic publication content. The user can edit the electronic publication on an editing device, the changes to the electronic publication can be automatically synchronized to the portable device, and the user can review the changes on the portable device to determine if the changes fixed the error.

In some implementations, electronic publication files associated with an electronic publication page currently displayed on the portable device can be synchronized before other electronic publication files. For example, the electronic publication client application can send the electronic publication synchronization application information identifying the currently displayed page of the electronic publication. electronic publication files associated with currently viewed page can be given synchronization priority. For example, if the user is proofing page forty (40) of chapter two (2), the electronic publication file that includes page forty will by synched first, the electronic publication files that include chapter two will be synched second, and then the remaining electronic publication file changes will be synched. Thus, a user can quickly see the changes most relevant to the page of the electronic publication that the user is currently proofing.

In some implementations, the content veil can be lifted once the current page is synchronized. For example, if synchronization prioritization is used, the electronic publication files associated with the currently displayed page of the electronic publication are synchronized first. Once the current page is synchronized, the veil can be lifted allowing the user to continue proofing the current page. In some implementations, synchronization of the remaining changed electronic publication pages can be performed in the background while the user is proofing the currently displayed page.

Other prioritization mechanisms can be implemented. In some implementations, synchronization of electronic publication files can be prioritized based on file type. For example, text files can be synched before image files, image files synched before audio files, audio files synched before video files.

Synchronization on Demand

In some implementations, synchronization of changed electronic publication files can be performed on demand. For example, instead of forcing a user to wait for a full synchronization before viewing electronic publication content, synchronization of content can be performed as needed thereby allowing the user to continue proofing the electronic publication content without having to wait for all changes to be synchronized. For example, if changes have been made to pages 4, 20 and 35 of an electronic publication and the user is proofing page 4, only page 4 may be immediately synchronized. The user will only have to wait for changes to page 4 to synchronize. As the user continues proofing the electronic publication and approaches page 20 (e.g., the user is on page 19), page 20 can be synchronized in the background as the user proofs page 19. Thus, when the user reaches page 20, the updates have already been synchronized and the user does not have to wait for the synchronization process to complete.

Electronic Publication Validation

In some implementations, synchronization application can validate an electronic publication before synchronizing the electronic publication to a portable device. For example, if an electronic publication file is an HTML file, the synchronization application can validate the HTML by checking for errors (e.g., misplaced bracket, misspelled tags, etc.) in the HTML. If validation fails (e.g., errors are found) the synchronization application can notify the user of the error. For example, the synchronization application can display a message indicating the type of error found.

Electronic Publication Submission

In some implementations, the synchronization application can facilitate submission of the electronic publication to a distributor for approval. For example, an electronic media distributor (e.g., online store) may perform steps to validate and approve an electronic publication for distribution. The synchronization application can provide an interface that allows a user to upload the electronic publication to the distributor. For example, once the user is satisfied with the proofed electronic publication, the user can select a 'submit' button on the interface of the synchronization application to cause the synchronization application to transmit the electronic publication to the distributor.

Debugging

In some implementations, the synchronization application can provide debugging features to aid a user in debugging electronic publication content. For example, the synchronization application can provide a console for displaying diagnostic messages. The synchronization application can display graphics and data for conveying information, such as memory usage, frame rate or any other diagnostic information. For example, the synchronization application can display an error message if the portable device with which the synchronization application is attempting to synchronize is busy. The synchronization application can display an error message if the portable device does not have the electronic publication client installed or if the electronic publication client is not currently running on the portable device. The synchronization application can display an error message if the portable device has an old, incompatible or outdated version of the electronic publication client.

Example Mobile Device Architecture

Figure 9:
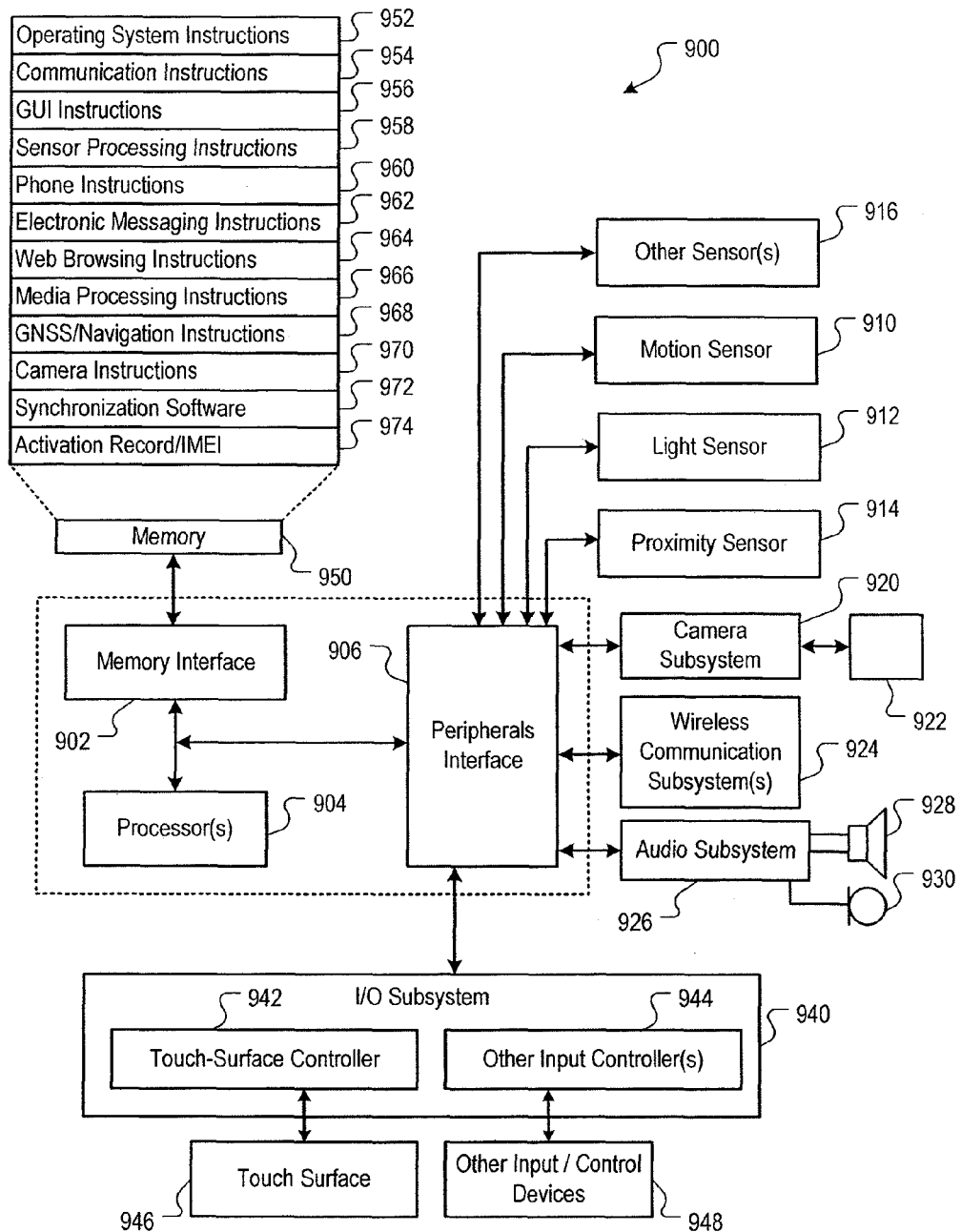
FIG. 9 is a block diagram of an exemplary system architecture implementing the features and processes of FIGS. 1-8.

FIG. 9 is a block diagram 900 of an example implementation of the devices 102, 104, 106 and/or 108 of FIG. 1. The devices 102, 104, 106 and/or 108 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the mobile device 100 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the mobile device 100 is intended to operate. For example, a mobile device 100 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the mobile device 100 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the one or more of the electronic publication synchronization features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store electronic publication synchronization software instructions 972 to facilitate the electronic publication synchronization and proofing processes and functions as described with reference to FIGS. 1-8. For example, software instructions 972 can include instructions for performing server-side electronic publication monitoring and synchronization processes. Software instructions 972 can include instructions for performing client-side electronic publication synchronization and content presentation processes.

The memory 950 can also store other software instructions (not shown), such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing related processes and functions and video processing-related processes and functions, respectively. An activation record and International Mobile Equipment Identity (IMEI) 974 or similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the mobile device 100 can be implemented in hardware and/or in software, including in one or more signal processing and/or application specific integrated circuits.

Therefore, according to the above, some examples of the disclosure are directed to a method comprising: receiving, at an editing device, input identifying files associated with an electronic publication; monitoring, at the editing device, file metadata associated with the electronic publication files for data indicative of a modification to the electronic publication files; identifying one or more modified files based on the monitoring; transmitting file metadata associated with the modified files to a portable device coupled to the editing device; receiving file information from the portable device identifying at least one of the modified files; and transmitting the at least one identified modified file to the portable device. Additionally or alternatively to one or more of the examples disclosed above, in some examples the method further comprises: obtaining information identifying a particular file that is currently displayed on the portable device; and prioritizing the transmission of the at least one identified modified file to the portable device based on the particular file.

Some examples of the disclosure are directed to a method comprising: displaying content of an electronic publication on a portable device; receiving, from an editing device, electronic publication file metadata corresponding to one or more files of the electronic publication stored on the portable device; comparing the received file metadata to local file metadata associated with the one or more files; based on the comparison, identifying at least one changed file; transmitting, to the editing device, information identifying the at least one changed file; receiving the at least one changed file from the editing device; and refreshing the display of the electronic publication content on the portable device. Additionally or alternatively to one or more of the examples disclosed above, in some examples refreshing the display includes restarting an application used for displaying the electronic publication content. Additionally or alternatively to one or more of the examples disclosed above, in some examples refreshing the display includes temporarily hiding the content. Additionally or alternatively to one or more of the examples disclosed above, in some examples receiving the at least one changed file from the editing device includes receiving a file associated with currently displayed content before files not associated with the currently displayed content. Additionally or alternatively to one or more of the examples disclosed above, in some examples receiving the at least one changed file from the editing device includes receiving text files before image files.

Some examples of the disclosure are directed to a non-transitory computer-readable medium including one or more sequences of instructions which, when executed by one or more processors, causes: receiving input identifying files associated with an electronic publication; monitoring file metadata associated with the electronic publication files for data indicative of a modification to the electronic publication files; identifying one or more modified files based on the monitoring; transmitting file metadata associated with the modified files to a portable device; receiving file information from the portable device identifying at least one of the modified files; and transmitting the at least one identified modified file to the portable device. Additionally or alternatively to one or more of the examples disclosed above, in some examples the instructions cause: obtaining information identifying a particular file that is currently displayed on the portable device; and prioritizing the transmission of the at least one identified modified file to the portable device based on the particular file.

Some examples of the disclosure are directed to a non-transitory computer-readable medium including one or more sequences of instructions which, when executed by one or more processors, causes: displaying content of an electronic publication on a portable device; receiving, from an editing device, electronic publication file metadata corresponding to one or more files of the electronic publication stored on the portable device; comparing the received file metadata to local file metadata associated with the one or more files; based on the comparison, identifying at least one changed file; transmitting, to the editing device, information identifying the at least one changed file; receiving the at least one changed file from the editing device; and refreshing the display of the electronic publication content on the portable device. Additionally or alternatively to one or more of the examples disclosed above, in some examples the instructions that cause refreshing the display include instructions that cause restarting an application used for displaying the electronic publication content. Additionally or alternatively to one or more of the examples disclosed above, in some examples the instructions that cause refreshing the display include instructions that cause temporarily hiding the content. Additionally or alternatively to one or more of the examples disclosed above, in some examples the instructions that cause receiving the at least one changed file from the editing device include instructions that cause receiving a file associated with currently displayed content before files not associated with the currently displayed content. Additionally or alternatively to one or more of the examples disclosed above, in some examples the instructions that cause receiving the at least one changed file from the editing device include instructions that cause receiving text files before image files.

Some examples of the disclosure are directed to a system comprising: one or more processors; and a non-transitory computer-readable medium including one or more sequences of instructions which, when executed by the one or more processors, causes: receiving input identifying files associated with an electronic publication; monitoring file metadata associated with the electronic publication files for data indicative of a modification to the electronic publication files; identifying one or more modified files based on the monitoring; transmitting file metadata associated with the modified files to a portable device; receiving file information from the portable device identifying at least one of the modified files; and transmitting the at least one identified modified file to the portable device. Additionally or alternatively to one or more of the examples disclosed above, in some examples the instructions cause: obtaining information identifying a particular file that is currently displayed on the portable device; and prioritizing the transmission of the at least one identified modified file to the portable device based on the particular file.

Some examples of the disclosure are directed to a system comprising: one or more processors; and a non-transitory computer-readable medium including one or more sequences of instructions which, when executed by the one or more processors, causes: displaying content of an electronic publication on a portable device; receiving, from an editing device, electronic publication file metadata corresponding to one or more files of the electronic publication stored on the portable device; comparing the received file metadata to local file metadata associated with the one or more files; based on the comparison, identifying at least one changed file; transmitting, to the editing device, information identifying the at least one changed file; receiving the at least one changed file from the editing device; and refreshing the display of the electronic publication content on the portable device. Additionally or alternatively to one or more of the examples disclosed above, in some examples the instructions that cause refreshing the display include instructions that cause restarting an application used for displaying the electronic publication content. Additionally or alternatively to one or more of the examples disclosed above, in some examples the instructions that cause refreshing the display include instructions that cause temporarily hiding the content. Additionally or alternatively to one or more of the examples disclosed above, in some examples the instructions that cause receiving the at least one changed file from the editing device include instructions that cause receiving a file associated with currently displayed content before files not associated with the currently displayed content. Additionally or alternatively to one or more of the examples disclosed above, in some examples the instructions that cause receiving the at least one changed file from the editing device include instructions that cause receiving text files before image files.

What is claimed is:

1. A method comprising:
    detecting a first modification to a first portion of a document and a second modification to a second portion of the document on a first device;
    after detecting the first modification and the second modification, obtaining information indicating which portion of the document is currently displayed on a portable device;
    in response to obtaining the information indicating which portion of the document is currently displayed on the portable device:
        in accordance with a determination that the first portion of the document is currently displayed on the portable device and while the first portion of the document continues to be displayed on the portable device:
            transmitting the first modification to the portable device; and
            after transmitting the first modification to the portable device, transmitting the second modification to the portable device; and
        in accordance with a determination that the second portion of the document is currently displayed on the portable device and while the second portion of the document continues to be displayed on the portable device:
            transmitting the second modification to the portable device; and
            after transmitting the second modification to the portable device, transmitting the first modification to the portable device.

2. A method comprising:
    displaying a first respective portion of a document on a portable device without displaying a second respective portion of the document;
    sending information to an editing device indicating that the first respective portion of the document is currently displayed on the portable device and that the second respective portion of the document is not currently displayed on the portable device;

after sending the information to the editing device, while the first respective portion of the document is displayed on the portable device, receiving, from the editing device, a first modification to the first respective portion of the document, and after receiving the first modification, receiving, from the editing device, a second modification to the second respective portion of the document, wherein:

in accordance with a first portion of the document being the first respective portion of the document, and a second portion of the document being the second respective portion of the document, the first modification is to the first portion of the document, and the second modification is to the second portion of the document, and in accordance with the second portion of the document being the first respective portion of the document, and the first portion of the document being the second respective portion of the document, the first modification is to the second portion of the document, and the second modification is to the first portion of the document; and refreshing the display of the first respective portion of the document on the portable device to reflect the first modification.

3. The method of claim 2, wherein refreshing the display includes restarting an application used for displaying the document.

4. The method of claim 2, wherein refreshing the display includes temporarily hiding the document.

5. The method of claim 2, wherein receiving the first modification from the editing device includes receiving text files before image files.

6. The method of claim 1, wherein the first portion of the document is currently displayed on the portable device, the second portion of the document is currently displayed on a second portable device, the first modification is transmitted to the portable device, and after the first modification is transmitted to the portable device, the second modification is transmitted to portable device, the method further comprising:

after detecting the first modification and the second modification and while the second portion of the document continues to be displayed on the second portable device:

transmitting the second modification to the second portable device; and after transmitting the second modification to the second portable device, transmitting the first modification to the second portable device.

7. The method of claim 1, further comprising:

in response to obtaining the information indicating which portion of the document is currently displayed on the portable device:

in accordance with a determination that a third portion of the document, not associated with a modification, is currently displayed on the portable device:

transmitting the first modification and the second modification to the portable device in an order that is independent of the display of the third portion on the portable device.

8. A non-transitory computer-readable medium including one or more sequences of instructions which, when executed by one or more processors, causes:

detecting a first modification to a first portion of a document and a second modification to a second portion of the document on a first device;

after detecting the first modification and the second modification, obtaining information indicating which portion of the document is currently displayed on a portable device;

in response to obtaining the information indicating which portion of the document is currently displayed on the portable device:

in accordance with a determination that the first portion of the document is currently displayed on the portable device and while the first portion of the document continues to be displayed on the portable device:

transmitting the first modification to the portable device; and after transmitting the first modification to the portable device, transmitting the second modification to the portable device; and in accordance with a determination that the second portion of the document is currently displayed on the portable device and while the second portion of the document continues to be displayed on the portable device:

transmitting the second modification to the portable device; and after transmitting the second modification to the portable device, transmitting the first modification to the portable device.

9. A non-transitory computer-readable medium including one or more sequences of instructions which, when executed by one or more processors, causes:

displaying a first respective portion of a document on a portable device without displaying a second respective portion of the document;

sending information to an editing device indicating that the first respective portion of the document is currently displayed on the portable device and that the second respective portion of the document is not currently displayed on the portable device;

after sending the information to the editing device, while the first respective portion of the document is displayed on the portable device, receiving, from the editing device, a first modification to the first respective portion of the document, and after receiving the first modification, receiving, from the editing device, a second modification to the second respective portion of the document, wherein:

in accordance with a first portion of the document being the first respective portion of the document, and a second portion of the document being the second respective portion of the document, the first modification is to the first portion of the document, and the second modification is to the second portion of the document, and in accordance with the second portion of the document being the first respective portion of the document, and the first portion of the document being the second respective portion of the document, the first modification is to the second portion of the document, and the second modification is to the first portion of the document; and refreshing the display of the first respective portion of the document on the portable device to reflect the first modification.

10. The computer-readable medium of claim 9, wherein the instructions that cause refreshing the display include instructions that cause restarting an application used for displaying the document.

11. The computer-readable medium of claim 9, wherein the instructions that cause refreshing the display include instructions that cause temporarily hiding the document.

12. The computer-readable medium of claim 9, wherein the instructions that cause receiving the first modification from the editing device include instructions that cause receiving text files before image files.

13. A system comprising:
one or more processors; and
a non-transitory computer-readable medium including one or more sequences of instructions which, when executed by the one or more processors, causes:
detecting a first modification to a first portion of a document and a second modification to a second portion of the document on a first device;
after detecting the first modification and the second modification, obtaining information indicating which portion of the document is currently displayed on a portable device;
in response to obtaining the information indicating which portion of the document is currently displayed on the portable device:
in accordance with a determination that the first portion of the document is currently displayed on the portable device and while the first portion of the document continues to be displayed on the portable device:
transmitting the first modification to the portable device; and
after transmitting the first modification to the portable device, transmitting the second modification to the portable device; and
in accordance with a determination that the second portion of the document is currently displayed on the portable device and while the second portion of the document continues to be displayed on the portable device:
transmitting the second modification to the portable device; and
after transmitting the second modification to the portable device, transmitting the first modification to the portable device.

14. A system comprising:
one or more processors; and
a non-transitory computer-readable medium including one or more sequences of instructions which, when executed by the one or more processors, causes:
displaying a first respective portion of a document on a portable device without displaying a second respective portion of the document;
sending information to an editing device indicating that the first respective portion of the document is currently displayed on the portable device and that the second respective portion of the document is not currently displayed on the portable device;
after sending the information to the editing device, while the first respective portion of the document is displayed on the portable device, receiving, from the editing device, a first modification to the first respective portion of the document, and after receiving the first modification, receiving, from the editing device, a second modification to the second respective portion of the document, wherein:
in accordance with a first portion of the document being the first respective portion of the document, and a second portion of the document being the second respective portion of the document, the first modification is to the first portion of the document, and the second modification is to the second portion of the document, and
in accordance with the second portion of the document being the first respective portion of the document, and the first portion of the document being the second respective portion of the document, the first modification is to the second portion of the document, and the second modification is to the first portion of the document; and
refreshing the display of the first respective portion of the document on the portable device to reflect the first modification.

15. The system of claim 14, wherein the instructions that cause refreshing the display include instructions that cause restarting an application used for displaying the document.

16. The system of claim 14, wherein the instructions that cause refreshing the display include instructions that cause temporarily hiding the document.

17. The system of claim 14, wherein the instructions that cause receiving the first modification from the editing device include instructions that cause receiving text files before image files.

* * * * *